US010744434B2

(12) United States Patent
Drohmann et al.

(10) Patent No.: US 10,744,434 B2
(45) Date of Patent: *Aug. 18, 2020

(54) USE OF POLYMERS COMPRISING THERMOPLASTIC POLYMERS AS FILTRATION AIDS AND/OR STABILISING AGENT

(75) Inventors: Christian Drohmann, Schifferstadt (DE); Tobias Petsch, Mörschied (DE); Thomas Keßler, Schifferstadt (DE); Frank Müller, Ludwigshafen (DE); Elisa Hamm de Bantleon, München (DE); Klemens Mathauer, Heidelberg (DE)

(73) Assignee: BASF SE (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/509,641

(22) PCT Filed: Apr. 2, 2003

(86) PCT No.: PCT/EP03/03439
§ 371 (c)(1),
(2), (4) Date: Sep. 29, 2004

(87) PCT Pub. No.: WO03/084639
PCT Pub. Date: Oct. 16, 2003

(65) Prior Publication Data
US 2005/0145579 A1    Jul. 7, 2005

(30) Foreign Application Priority Data

Apr. 5, 2002   (DE) .................................... 10215147

(51) Int. Cl.
B01D 39/06   (2006.01)
B01D 39/04   (2006.01)

(52) U.S. Cl.
CPC ............. B01D 39/06 (2013.01); B01D 39/04 (2013.01)

(58) Field of Classification Search
USPC ......... 210/777, 778, 193; 264/777, 778, 193
See application file for complete search history.

(56) References Cited

U.S. PATENT DOCUMENTS

| | | | |
|---|---|---|---|
| 3,216,579 A | 11/1965 | Shelanski et al. | |
| 3,452,123 A * | 6/1969 | Kleefisch Karl-Heinz et al. ........ 264/53 | |
| 3,958,023 A * | 5/1976 | Butterworth .................. | 426/271 |
| 3,974,072 A | 8/1976 | Birchall et al. | |
| 4,200,679 A | 4/1980 | Klein | |
| 4,207,378 A | 6/1980 | Klein | |
| 4,282,261 A * | 8/1981 | Greene ....................... | 426/330.4 |
| 4,344,846 A | 8/1982 | Klein | |
| 4,369,116 A | 1/1983 | Klein | |
| 4,427,157 A | 1/1984 | Klein | |
| 4,436,755 A | 3/1984 | Perdomini et al. | |
| 4,820,420 A | 4/1989 | Hums et al. | |
| 4,910,182 A | 3/1990 | Hums et al. | |
| 5,006,267 A | 4/1991 | Vaughn et al. | |
| 5,141,611 A * | 8/1992 | Ford .............................. | 568/717 |
| 5,262,053 A | 11/1993 | Meier | |
| 5,360,605 A | 11/1994 | Shanbrom | |
| 5,484,620 A | 1/1996 | Oechsle et al. | |
| 5,609,864 A | 3/1997 | Shanbrom | |
| 5,611,929 A * | 3/1997 | Libutti et al. ................. | 210/639 |
| 5,641,516 A * | 6/1997 | Grabowski et al. .......... | 424/489 |
| 5,665,369 A * | 9/1997 | Wedlock et al. ............. | 424/408 |
| 5,762,797 A | 6/1998 | Patrick et al. | |
| 5,773,519 A * | 6/1998 | Ito et al. ........................ | 525/276 |
| 5,776,353 A * | 7/1998 | Palm et al. .................... | 210/777 |
| 5,856,429 A | 1/1999 | Michos | |
| 5,885,638 A | 3/1999 | Takayanagi et al. | |
| 5,969,015 A * | 10/1999 | Zinke et al. .................. | 524/109 |
| 6,001,406 A | 12/1999 | Katzke et al. | |
| 6,013,706 A * | 1/2000 | Kleiner et al. ................ | 524/126 |
| 6,045,787 A | 4/2000 | Shanbrom | |
| 6,083,408 A | 7/2000 | Breitenbach et al. | |
| 6,096,216 A | 8/2000 | Shanbrom et al. | |
| 6,106,773 A | 8/2000 | Miekka et al. | |
| 6,117,459 A | 9/2000 | Van Den Eynde et al. | |
| 6,124,415 A | 9/2000 | Malawer et al. | |
| 6,503,702 B1 | 1/2003 | Stewart | |
| 6,569,455 B1 * | 5/2003 | Kanikanti et al. ............ | 424/464 |
| 6,620,305 B2 | 9/2003 | Cornell et al. | |
| 6,627,088 B1 | 9/2003 | Breitenbach et al. | |
| 6,733,680 B2 * | 5/2004 | Witteler et al. ............... | 210/777 |
| 6,736,981 B2 * | 5/2004 | Gomez et al. ................ | 210/777 |
| 6,756,013 B1 | 6/2004 | Cornell et al. | |
| 6,761,773 B1 * | 7/2004 | McKechnie et al. ............ | 134/1 |

(Continued)

FOREIGN PATENT DOCUMENTS

EP          351 363       1/1990
EP       0 483 099 B1    4/1997

(Continued)

OTHER PUBLICATIONS

Polyvinylpyrrolidone—PVPP downloaded from Wikipedia on Sep. 5, 2008, 3 pages.*
Malcolm A Kelland, History of the Development of Low Dosage Hydrate Inhibitors, Energy & Fuels—An American Chemical Society Journal, 23 pages, May/Jun. 2006.*
Patent abstract of Japan, Pub. No. 55104650.
Chapman and Hall, Berins, Michael L. (editor), Plastics Engineering Handbook of the Society of the Plastics Industry, Chapter 22, pp. 635-655, 1991, New York.
Definitions of "Conventional" downloaded from http://dictionary.reference.com/search?q=conventional on Sep. 15, 2006, 2 pages.
Chapman and Hall, Morton-Jones, David H., Polymer Processing, chapter 3.3, pp. 59-60, 1989, New York.

(Continued)

Primary Examiner — Robert J Popovics
(74) Attorney, Agent, or Firm — Faegre Drinker Biddle & Reath LLP

(57) ABSTRACT

The invention relates to the use of polymers comprising thermoplastic polymers as filtration aids and/or stabilising agent for the filtration or stabilisation of aqueous liquids.

17 Claims, No Drawings

(56) References Cited

U.S. PATENT DOCUMENTS

| | | | |
|---|---|---|---|
| 6,986,911 | B1 | 1/2006 | Brocheton et al. |
| 7,132,479 | B2 | 11/2006 | Engelhardt et al. |
| 7,153,534 | B2 | 12/2006 | Rehmanji et al. |
| 7,316,825 | B2 | 1/2008 | Brocheton et al. |
| 2002/0121488 | A1* | 9/2002 | Witteler et al. .............. 210/777 |
| 2002/0153331 | A1* | 10/2002 | Gomez et al. ................ 210/777 |
| 2003/0096993 | A1* | 5/2003 | Hayoz .......................... 544/215 |
| 2003/0124233 | A1 | 7/2003 | Gomez et al. |
| 2004/0026338 | A1 | 2/2004 | Biebuyck et al. |
| 2004/0094486 | A1 | 5/2004 | Drohmann et al. |
| 2008/0138427 | A1 | 6/2008 | Nagahara et al. |
| 2008/0146741 | A1 | 6/2008 | Mathauer et al. |

FOREIGN PATENT DOCUMENTS

| | | |
|---|---|---|
| EP | 0 778 084 B1 | 3/2000 |
| GB | 1 436 466 | 5/1976 |
| WO | 86/06589 A1 | 11/1986 |
| WO | 92/11085 A1 | 7/1992 |
| WO | 96/17923 A1 | 6/1996 |
| WO | 96/35497 | 11/1996 |
| WO | 96/35497 A1 | 11/1996 |
| WO | 97/29829 A1 | 8/1997 |
| WO | 2005/113738 A1 | 12/2005 |

OTHER PUBLICATIONS

Chapman and Hall, Berins, Michael L. (editor), Plastics Engineering Handbook of the Society of the Plastics Industry, chapter 22, p. 635, 1991, New York.

Der Doppelschneckenextruder: Grundlagen and Anwendungsgebiete [The double-screw extruder: Principles and areas of application], edited by VDI-Gesellschaft Kunststofftechnik,—Düsseldorf: VDI-Verlag, 1995, Chapter 7.

Aufbereiten von Polymeren mit neuartigen Eigenschaften [Compounding polymers having novel properties], edited by: VDI-Gesellschaft Kunststofftechnik,—Düsseldorf: VDI-Verlag, 1995, pp. 135ff.

Divergan (Reg. TM)—The PVPP from BASF—We keep it clear; date unknown; 12 pages.

BASF Fine Chemicals—Excipients & Actives for Pharma; 60th Anniversary of Povidone; 16 pages; Jul. 1999.

Final Office Action dated Sep. 4, 2008 in related case U.S. Appl. No. 10/398,179.

Office Action dated Jul. 13, 2007 in related case U.S. Appl. No. 10/398,179.

Advisory Action dated Sep. 18, 2006 in related case U.S. Appl. No. 10/398,179.

Final Office Action dated Jun. 13, 2006 in related case U.S. Appl. No. 10/398,179.

Office Action dated Jan. 12, 2006 in related case U.S. Appl. No. 10/398,179.

Office Action dated Jul. 13, 2005 in related case U.S. Appl. No. 10/398,179.

Office Action dated Mar. 28, 2005 in related case U.S. Appl. No. 10/398,179.

Office Action (Restriction Requirement) dated Nov. 30, 2004 in related case U.S. Appl. No. 10/398,179.

Malcolm A Kelland, History of the Development of Low Dosage Hydrate Inhibitors, Energy & Fuels—An American Chemical Society Journal, vol. 20, No. 3, May/Jun. 2006, published Apr. 1, 2006, pp. 825-847.

Yuri S. Lipatov, Polymer Reinforcement, Academy of Sciences of Ukraine, ChemTec Publishing, Ontario, Canada, 1995, pp. 255-312.

Harold F. Giles, Jr., Extrusion: the Definitive Processing Guide and Handbook, William Andrew Publishing, Norwich, NY, 2005, pp. 424-434.

Ullmann's Processes and Process Engineering, vol. 2 (2004), pp. 1421-1422.

Sommer, Ullmann's Encyclopedia of Industrial Chemistry (online), release 2008, 7th edition, update Apr. 22, 2008, chapter "Size Enlargement" by Karl Sommer, DOI: 10.1002/14356007.b02_07, pp. 1-40.

Koshal, D.: Manufacturing Engineer's Reference Book, Elsevier, Chapter 3, Metal Casting and Moulding Processes, (1993). pp. 3/3-3/23.

Drobny, JG: Handbook of Thermoplastic Materials, Chapter 4, Processing Methods Applicable to Thermoplastic Elastomers, William Andrew Publishing, Norwich NY (2007), pp. 29-72, and 118-119.

Non-final Office action dated Feb. 20, 2009 in co-pending U.S. Appl. No. 10/398,179, pp. 1-11.

Bühler, Volker Kollidon® Polyvinylpyrrolidone for the pharmaceutical industry, BASF, Ludwigshafen, Feb. 1999 (4th edition), pp. 15-17, 88-91, and 129-131.

Final Office action dated Jul. 1, 2009 in co-pending U.S. Appl. No. 10/398,179, cover page and pp. 1-11.

Polyvinylpyrrolidone downloaded from Wikipedia on Jun. 24, 2009—3 Pages.

Lewis, Richard J. Sr. Sax's Dangerous Properties of Industrial Materials (11th Edition) vols. 1-3. (pp. 3016). John Wiley & Sons.

Gopal, C. et al., "PVPP—the route to effective beer stabilization." *Brewers' Guardian* (May 2000), 1-6.

\* cited by examiner

USE OF POLYMERS COMPRISING THERMOPLASTIC POLYMERS AS FILTRATION AIDS AND/OR STABILISING AGENT

The present invention relates to the use of polymers comprising thermoplastic polymers as filter aids and/or stabilizers for the filtration and/or stabilization of aqueous liquids.

Separation of solid-liquid mixtures of substances by filtration is an important process step in many industrial production processes. The term filter aid encompasses a number of products which are used in bulk, pulverulent, granulated or fibrous form as precoat material in filtration.

Filter aids can be applied, before the start of filtration, as auxiliary filter layer (precoat filter) to the filter medium, to achieve a looser cake structure, or can be added continuously to the slurry to be filtered.

Known filter additives are, for example, diatomaceous earth, natural products resulting from the calcination of diatomite. The main constituents are amorphous $SiO_2$ modifications, accompanied by oxides of aluminum, iron and other elements, and also their silicate compounds. Perlites are calcined, ground and selected expanded clays of volcanic origin (rhyolites). The structure may be described as sheet-like and chemically as a sodium, potassium or aluminum silicate. Bentonites are clay minerals having high swelling capacity and absorption capacity.

Filter aids should, during filtration, form a porous environment which takes up the impurities to be eliminated and facilitates the outflow of the liquid phase.

The additives should have an elevated porosity and should also not deform under the effect of pressure. In addition the substances should be chemically inert and easily recoverable.

For filtering beer, currently, predominantly kieselguhr precoat filters and depth filters are used. In precoat filtration, before the start of filtration, a kieselguhr precoat is applied to a support surface (filter cloth). After this precoat is applied, a mixture of fine and coarse kieselguhr is added to the beer to be filtered (filter feed). In the production of beer, a kieselguhr consumption of 150 to 200 g/hl of beer must be expected. Kieselguhr is particularly proven for precoat filtration because of its high pore volume, its low bulk density, its high absorption capacity and its high specific surface area.

A disadvantage of the use of kieselguhr is that, after a number of filtration operating hours, its effectiveness is exhausted due to retained solids material and it must be removed from the filter support surfaces and replaced.

Landfilling exhausted kieselguhr, owing to legal regulations, is only possible with great difficulty and cost. Attempts to regenerate the kieselguhr which is unusable as filter material have not proved to be feasible in practice. In addition, kieselguhr has been under discussion for some time because of its possible carcinongenic activity.

The removal of materials causing haze, such as dissolved polyphenols or proteins, is also an important process step in many beverage production processes, because removing these substances leads to a longer shelf life of the beverages.

The beverages can be stabilized by adding substances which bind, precipitate or in other ways remove the materials causing the haze from the medium. These substances include, for example, silica gel, which binds or precipitates proteins, or polyvinylpyrrolidone, which binds polyphenols.

Filter aids and stabilizers have previously been used separately or together. In the first case, however, this means increased equipment requirements, and in the second case the joint disposal is a problem; in addition, in the case of the substances previously used, it is not possible to regulate the adsorption.

EP 351 363 describes highly crosslinked polyvinylpolypyrrolidones (PVPP) as stabilizers and filter aids. However, when polyvinylpolypyrrolidone is used alone, it is difficult to adjust the adsorption.

U.S. Pat. No. 4,344,846 describes a method for precoat filtration using filter aids based on expanded polystyrene.

WO 96/35497 describes regenerable filter aids for filtering a liquid medium, in particular beer, which comprise granules of synthetic or natural polymers that form a filtercake having a porosity from 0.3 to 0.5.

It is an object of the present invention to provide a filter aid and/or stabilizer which can be used instead of kieselguhr in the filtration and/or stabilization of aqueous liquids, in particular in beer and beverage production. It should not only be usable solely either as filter aid or as stabilizer, but also for both functions as well. It should be insoluble and scarcely swellable, chemically inert and of high surface area, and should be simple to produce in accepable reaction times. In addition, it should be possible to set the adsorption in targeted manner and it should be regeneratable.

We have found that this object is achieved, surprisingly, by the use of polymers comprising thermoplastic polymers.

The invention relates to the use of polymers comprising
(a) from 20 to 95% by weight of at least one thermoplastic polymer
(b) from 80 to 5% by weight of at least one further substance selected from the group consisting of silicates, carbonates, oxides, silica gel, kieselguhr, diatomaceous earth, other polymers or mixtures thereof
as filter aids and/or stabilizers for filtering and/or stabilizing an aqueous liquid, with the proviso that the thermoplastic polymer must not be polystyrene.

The invention further relates to a process for filtering and/or stabilizing an aqueous liquid, which comprises using as filter aid or stabilizer a polymer comprising
(a) from 20 to 95% by weight of at least one thermoplastic polymer
(b) from 80 to 5% by weight of at least one further substance selected from the group consisting of silicates, carbonates, oxides, silica gel, kieselguhr, diatomaceous earth, further polymers or mixtures thereof,
with the proviso that the thermoplastic polymer must not be polystyrene.

The process can be carried out in such a manner that in each case only filtration or stabilization of the aqueous medium takes place, or, in addition to the filtration, simultaneous stabilization takes place. Preferably, in addition to the filtration, stabilization also takes place.

During the filtration, the precoat filtration technique is preferably used.

Surprisingly, by means of the inventive polymers, the adsorption of the constituents causing haze in beverages, for example, can be adjusted in a targeted manner.

If, for example in the case of beer, the polyphenols present therein are completely removed, the beer also loses by this measure its flavor compounds.

A further advantage of the use of the inventive polymers is their regenerability.

For the purposes of the invention the thermoplastic polymers set forth under (a) are amorphous noncrosslinked and partially crystalline noncrosslinked polymers. They are meltable and can be processed by extrusion, injection molding or in a spinning process. They are frequently soluble in organic solvents. They contain not only crystalline but also amorphous regions. The macromolecular chains here pass through a plurality of regions and thus produce the cohesion of the polymer (see also Handbuch der Technischen Polymerchemie [Handbook of industrial polymer chemistry], A. Echte, 1st edition, 1993, VCM, Weinheim). For example, these are taken to mean polyolefins, vinylpolymers, polyamides, polyesters, polyacetates, polycarbonates or else polyurethanes and isomers.

Preferably, the partially crystalline thermoplastics are polyethylene, polyoxymethylene or polypropylene. The amorphous thermoplastics are preferably polyvinyl chloride or polymethacrylate.

The thermoplastic polymers (a) are used in the context of the invention in amounts of from 20 to 95% by weight, preferably from 40 to 90% by weight, in particular preferably from 60 to 90% by weight, based on the total amount of filter aid.

For the purposes of the invention the carbonates under (b) are alkali metal carbonates or alkaline earth metal carbonates, alkali metal hydrogencarbonates or alkaline earth metal hydrogencarbonates, preferably calcium carbonate, sodium hydrogencarbonate or potassium hydrogencarbonate. Oxides are oxides or mixed oxides of subgroup 4 or subgroup 3, preferably titanium oxide or aluminum oxide.

Silicates are natural and artificial silicates not explicitly referred to above; these also include mixed silicates such as aluminosilicates or else zeolites.

Further polymers under (b) are preferably polyamide or crosslinked polyvinyllactam and/or polyvinylamine. Polyvinyllactam and/or polyvinylamine preferably used are: polyvinylpyrrolidone, polyvinylpiperidone, polyvinylcaprolactam, polyvinylimidazole, polyvinyl-2-methylimidazole, polyvinyl-4-methylimidazole, polyvinylformamide. Particular preference is given to highly crosslinked polyvinylpolypyrrolidone, for example that obtainable under the tradename Divergan® F.

This is customarily obtained by what is termed popcorn polymerization. This is a polymerization method in which the growing polymer chains crosslink with one another. This can take place in the presence or absence of a crosslinker.

Crosslinkers are compounds which contain at least two ethylenically unsaturated non-conjugated double bonds in the molecule. Preferred crosslinkers are divinylbenzene, N,N'-divinylethyleneurea, N,N'-divinylpropylurea, alkylenebisacrylamides, alkylene glycol di(meth)acrylates.

The end product of popcorn polymerization is a foamed, crusty, granular polymer having a cauliflower-like structure. Because of their generally high degree of crosslinking, popcorn polymers are generally insoluble and scarcely swellable.

The epitopes specified under (b) can be present in the filter aid either alone or else in mixtures. Additives used alone are preferably crosslinked polyvinylpyrrolidone, $TiO_2$, $KHCO_3$, $NaHCO_3$, $CaCO_3$, silica gel, kieselguhr, diatomaceous earth or bentonite. Preferably, mixtures of crosslinked polyvinylpyrrolidone, i.e., polyvinylpolypyrrolidone (PVPP) with $TiO_2$, $NaHCO_3$, $KHCO_3$, $CaCO_3$, silica gel, kieselguhr, diatomaceous earth or bentonite or mixtures of $NaHCO_3$ or $KHCO_3$ with $CaCO_3$, $TiO_2$, silica gel, kieselguhr, diatomaceous earth or bentonite or else mixtures of $TiO_2$ with $NaHCO_3$, $KHCO_3$, $CaCO_3$, silica gel, kieselguhr, diatomaceous earth or bentonite are used. Crosslinked polyvinylpyrrolidone is particularly preferably used.

The thermoplastics used can be prepared by processes known per se. Such processes are described, for example, in A. Echte; *Handbuch der Technischen Polymerchemie* [*Handbook of industrial polymer chemistry*]; VCH, Weinheim, 1993.

To produce the polymer powders, the thermoplastic polymers and at least one further substance are compounded in an extruder.

Compounding is generally mixing a polymer with at least one additive (*Der Doppelschneckenextruder: Grundlagen- und Anwen-dungsgebiete* [*The double-screw extruder: principle and areas of application*], edited by: VDI-Gesellschaft Kunststofftechnik-Düsseldorf: VDI-Verlag, 1995, chapter 7 and *Aufbereiten von Polymeren mit neuartigen Eigenschaften* [*Compounding polymers having novel properties*], edited by: VDI-Gesellschaft Kunststofftechnik-Düsseldorf: VDI-Verlag, 1995, pp. 135 ff.). Compounding polymers by filling and reinforcing is carried out in the case of polyolefins and polystyrene, for example, for specific improvement of the properties and to reduce the manufacturing costs. The fillers may be differentiated according to their particle geometry by the aspect ratio. If the value is less than 10, the substance is a pure filler (extender), and a reinforcing action is usually only achieved at higher values. This effect can be reinforced by pronounced adhesion forces between additive and polymer. Fillers frequently used are calcium carbonate (chalk) and talcum. Because of its approval for food, calcium-carbonate-filled polypropylene has also been widely used for food packages (injection molding, thermoforming). In addition, filling polypropylene with sawdust is described for sheets which are used in automobile construction. Other customary fillers are glass (for example in bead form), asbestos, silicates (for example wollastonite), mica, spars and graphite. A usual filler content is 20-80% by mass, but it can also be up to 95%. By reinforcing thermoplastics with fibrous substances the mechanical properties are improved, in particular rigidity and hardness of the plastic. The fibers customarily used are glass fibers, carbon fibers, steel fibers and aramid fibers. By mixing at least two plastics, blending polymers having a different property profile are obtained. The mixtures can be homogeneous, heterogeneous or of partial or limited compatibility.

In all cases the use of extruders, in particular twin-screw extruders, is preferred. In addition, however, cokneaders also occur.

Customarily, during extrusion temperatures and pressures occur which, in addition to the purely physical mixing, can make possible a chemical reaction, that is to say a chemical change in the starting components.

For the purposes of the invention, reaction is a process in which at least two substances are reacted with one another physically and/or chemically.

The reaction can also take place by the customary processes for processing thermoplastics, in particular mixing, dispersing, filling, reinforcing, blending, degassing, and reactive compounding by rolling, kneading, casting, sintering, pressing, compounding, calendering, extrusion or combination of these methods. However, preferably, the polymer powders are compounded in an extruder.

For the purposes of the invention, filtration is passing a suspension (slurry) consisting of a discontinuous phase (dispersed substances) and a continuous phase (dispersion medium) through a porous filter medium. During this operation, solids particles are deposited on the filter medium and the filtered liquid (filtrate) leaves the filter medium in a clear state. An applied pressure difference acts here as an external force to overcome the resistance to flow.

In the filtration operation, fundamentally differing solids separation mechanisms can be observed. Chiefly, these are surface filtration or cake filtration, depth filtration and screening filtration. Frequently, filtration involves a combination of at least two processes.

In the case of surface or cake filtration, what are termed precoat filters in various embodiments are used for beverage filtration (Kunze, Wolfgang, Technologie Brauer und Mälzer [Brewing and malting technology], 7th edition, 1994, p. 372). All precoat systems share the fact that the solids present in the liquid to be filtered and also the intentionally added solids (filter aids) are retained by a filter medium, a filter cake building up. The suspension must flow through this in the course of filtration, in addition to the filter medium. Filtration of this type is also termed precoat filtration.

For the purposes of the invention, liquids to be filtered and/or stabilized are fruit juices or fermented beverages, such as wine or beer. In particular, the inventive process is used for filtering and/or stabilizing beer.

The inventively prepared filter aids and/or stabilizers are distinguished by high wettability with water and constant flow rate with, at the same time, good filtration efficiency.

The filter aids are comminuted after the mixing process by pelletizing, shredding and/or grinding, preferably by a sequence of pelletizing and grinding. Under the temperature conditions of a cold-grinding process, water may remain in the final product.

The resultant powders have a mean particle size of from 1 to 1000 µm, preferably from 2 to 200 µm. They have either an irregular or regular structure, which may be spheroidal or nonspheroidal. However, preferably, the resultant powders are nonspheroidal.

The examples below are intended to describe the invention in more detail, but without restricting it thereto.

A) Production of Polymer Powders

A thermoplastic polymer and at least one further substance (total amount approximately 10 kg) are compounded in an extruder. The extrudate is cooled in a water bath and pelletized. The resultant pellets are comminuted in an impact disk mill and screened using a vibrating tumble screen.

The weight ratios in which the thermoplastic polymer and respective additives (substance 1, where appropriate also substance 2) have been compounded is given by the table below. The sample identification is given in brackets after the weight ratio.

| # | Thermoplastic polymer | Substance 1 | Substance 2 | Ratio of thermoplastic polymer: substance 1 (where appropriate: substance 2) |
|---|---|---|---|---|
| 1 | polypropylene | kieselguhr | — | 20:80 (1a); 50:50 (1b); 80:20 (1c); 90:10 (1d) |
| 2 | polypropylene | $CaCO_3$ | — | 60:40 (2a); 80:20 (2b) |
| 3 | polypropylene | $TiO_2$ | — | 60:40 (3a); 80:20 (3b) |
| 4 | polypropylene | PVPP | — | 60:40 (4a); 80:20 (4b) |
| 5 | polypropylene | silica gel | — | 80:20 (5a) |
| 6 | polypropylene | bentonite | — | 80:20 (6a) |
| 7 | polypropylene | PVPP | silica gel | 70:25:5 (7a); 70:28:2 (7b) |
| 8 | polyethylene | kieselguhr | — | 50:50 (8a); 80:20 (8b); 90:10 (8c) |
| 9 | polyethylene | $CaCO_3$ | — | 60:40 (9a); 80:20 (9b) |
| 10 | polyethylene | $TiO_2$ | — | 60:40 (10a); 80:20 (10b) |
| 11 | polyethylene | PVPP | — | 60:40 (11a); 80:20 (11b) |
| 12 | polyethylene | silica gel | — | 80:20 (12a) |
| 13 | polyethylene | bentonite | — | 80:20 (13a) |
| 14 | polyethylene | PVPP | silica gel | 70:25:5 (14a); 70:28:2 (14b) |
| 15 | polyamide | kieselguhr | — | 20:80 (15a); 50:50 (15b); 80:20 (15c); 90:10 (15d) |
| 16 | polyamide | $CaCO_3$ | — | 60:40 (16a); 80:20 (16b) |
| 17 | polyamide | $TiO_2$ | — | 60:40 (17a); 80:20 (17b) |

In the table:
Polypropylene: denotes Novolen, BASF
Polyethylene: denotes Lupolen ®, BASF
Polyamide: denotes Ultramid ®, BASF
Kieselguhr: denotes kieselguhr, Merck, CAS No. 68855-54-9;
$CaCO_3$: denotes calcium carbonate (precipitated, ultrapure), Merck, CAS No. 471-34-1;
$TiO_2$: denotes titanium dioxide (<325 mesh, 99%), Aldrich, CAS No. 1317-70-0;
PVPP: denotes Divergan F, BASF, CAS No. 9003-39-8;
$NaHCO_3$: denotes sodium hydrogencarbonate (ultrapure), Merck, CAS No. 144-55-8;
Silica gel: denotes silica gel, Merck, CAS No. 63231-67-4;
Bentonite: denotes bentonite, Aldrich.

B) Application Tests

Filtration of a Standard Turbidity Solution

The filtration efficiency is assessed in precoat filtration on the basis of clarification of a standard turbidity solution, that is a formazine solution of defined turbidity which is known to those skilled in the art for characterizing filter aids for the beverage industry.

The criteria of a good test result are constancy of flow rate and of precoat pressure and the filtration efficiency, that is to say clarity of the filtrate:

the precoat pressure upstream and downstream of the filter is the same when the flow through the filter is good, that is to say there is no plugging of the filter. Turbidity is determined by a standard EBC test. A liquid is judged to be clear when the EPC turbidity values are <1.

Below, studies are described using the polymer samples described in section A. Here, preferably, the grinding fraction having a particle size less than 100 µm is used.

The table shown below reports the values after passage of a volume of 5 l, 10 l and 15 l for selected samples.

Filtration efficiency and flow through the filter

| Sample | 1c | 11b |
|---|---|---|
| EBC turbidity[1) 2)] after passage of a volume of | | |
| 5 l | 2.51 | 1.78 |
| 10 l | 1.41 | 1.25 |

-continued

| Sample | 1c | 11b |
| --- | --- | --- |
| 15 l | 0.92 | 0.76 |
| Flow rate[3] (l h$^{-1}$) | 40[4] | 40[4] |
| Precoat pressure[5] (bar) (upstream/downstream of filter body) | 1.5[4]/1.5[4] | 1.5[4]/1.5[4] |

[1])EBC: European Brewery Convention.
[2])The zero value, that is to say the value of the standard turbidity solution is 20 EBC.
[3])The flow rate without a filter aid is 40 l h$^{-1}$.
[4])The measured value is constant during the entire filtration period.
[5])The precoat pressure of the pure liquid, that is to say without filter aid, is 1.5 bar.

The invention claimed is:

1. A filter aid for filtering and stabilizing an aqueous liquid, the filter aid comprising a comminuted form of a compounded polymer obtained by reactive compounding
   a) 20-95% by weight of a thermoplastic polymer selected from the group consisting of polyolefins and polyamides; and
   b) 80-5% by weight of at least one further substance selected from the group consisting of silicates, carbonates, oxides, diatomaceous earth, PVPP and mixtures thereof
   wherein the reactive compounding is selected from the group consisting of rolling, kneading, casting, sintering, pressing, compounding, calendaring, extrusion or combination thereof.

2. The filter aid of claim 1, wherein the further substance b) is selected from the group consisting of alkali metal carbonates, alkali earth metal carbonates, alkali metal hydrogen carbonates, alkali earth metal hydrogencarbonates, oxides of subgroup 4 of the Periodic Table of the Elements, and oxides of main group 3 of the Periodic Table of the Elements.

3. A process for filtering and stabilizing an aqueous liquid, which comprises adding to the liquid the filter aid of claim 2, and filtering the aqueous liquid.

4. The filter aid of claim 1, wherein the at least one additional substance b) is PVPP.

5. A process for filtering and stabilizing an aqueous liquid, which comprises adding to the liquid the filter aid of claim 4, and filtering the aqueous liquid.

6. The filter aid of claim 1, wherein the filter aid comprises at least two additional substances b).

7. A process for filtering and stabilizing an aqueous liquid, which comprises adding to the liquid the filter aid of claim 6, and filtering the aqueous liquid.

8. A process for filtering and stabilizing an aqueous liquid, which comprises adding to the liquid the filter aid of claim 1, and filtering the aqueous liquid.

9. The process of claim 8 wherein the aqueous liquid is a fruit juice or a fermented beverage.

10. The process of claim 9 wherein the fermented beverage is beer.

11. The filter aid of claim 1 wherein the comminuted filter aid is in the form of non-spheroidal particles.

12. The filter aid of claim 1, wherein the compounded polymer comprises 60-90% by weight of a) and 40-10% by weight of b).

13. The filter aid of claim 1 wherein the reactive compounding is extrusion compounding.

14. A filter aid for filtering and stabilizing an aqueous liquid, the filter aid comprising a comminuted form of a compounded polymer obtained by reactive compounding
   a) 20-95% by weight of a thermoplastic polymer selected from the group consisting of polyolefins and polyamides; and
   b) 80-5% by weight of at least one further substance selected from the group consisting of silicates, carbonates, oxides, diatomaceous earth, PVPP and mixtures thereof wherein the reactive compounding is selected from the group consisting of rolling, kneading, casting, sintering, pressing, compounding, calendaring, extrusion or combination thereof wherein the comminuted form of a compounded polymer has a mean particle size from 1 to 1,000 µm.

15. The filter aid according to claim 14, wherein the comminuted form of a compounded polymer has a mean particle size from 2 to 200 µm.

16. The filter aid according to claim 15, wherein the comminuted form of a compounded polymer has a mean particle size from 1 to 100 µm.

17. The filter aid according to claim 16, wherein the compounded polymer comprises 60 to 90% by weight of the thermoplastic polymer and 40 to 10% by weight of PVPP.

* * * * *